July 24, 1934.    J. M. WILSON    1,967,851
PILOT VALVE
Filed Feb. 12, 1931
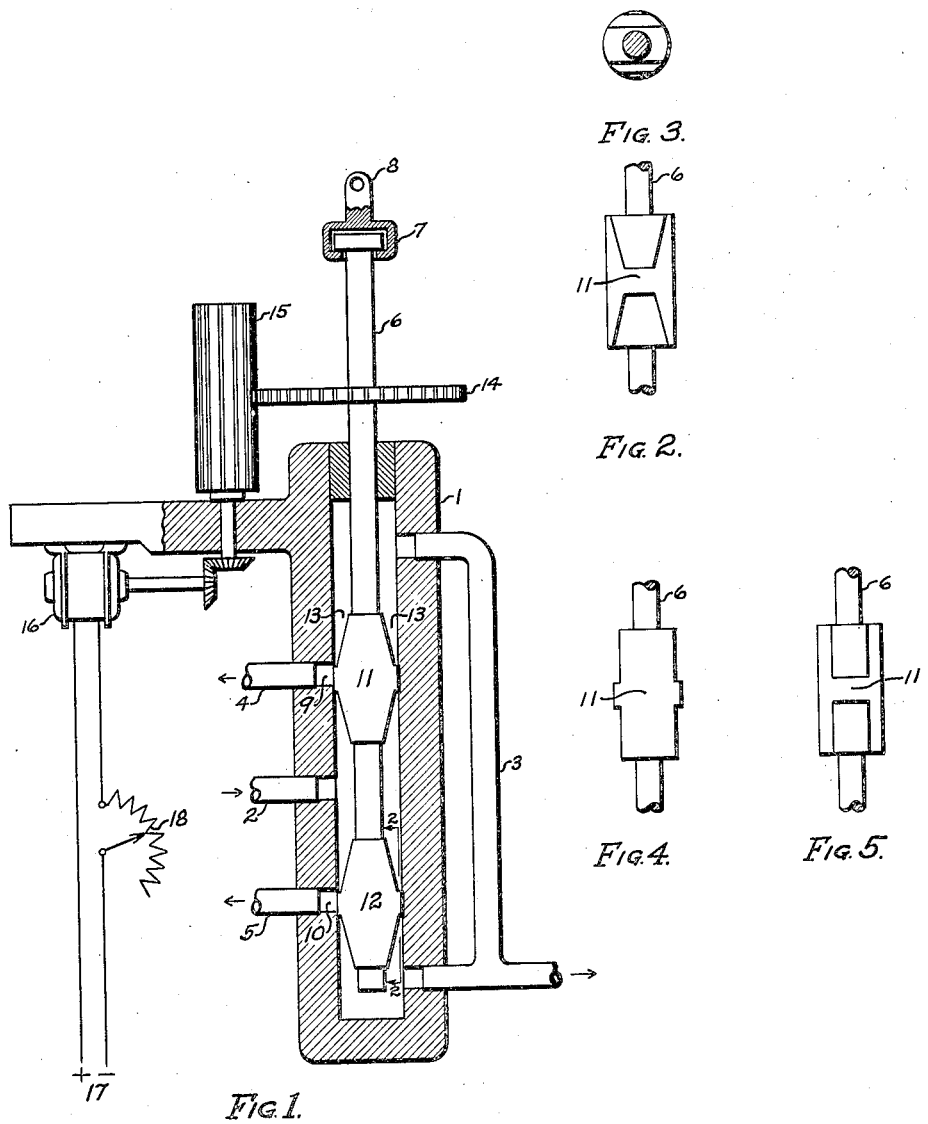
INVENTOR
James M. Wilson.
BY
ATTORNEY Patented July 24, 1934

1,967,851

UNITED STATES PATENT OFFICE 1,967,851

PILOT VALVE

James M. Wilson, East Cleveland, Ohio, assignor to Bailey Meter Company, a corporation of Delaware Application February 12, 1931, Serial No. 515,276

6 Claims. (Cl. 137—146)

This invention relates to pilot valves such as are used to control the passage of hydraulic fluid to hydraulic power devices, to the end that a relatively small control force is amplified and a relatively greater force is made available to perform useful work. The invention is particularly directed to providing a pilot valve having desired characteristics of rate of flow of hydraulic fluid to the hydraulic power device.

One object of my invention is to provide a pilot valve by means of which the hydraulic fluid is passed to the hydraulic power device intermittently or in increments.

Another object is to so construct the pilot that the rate of flow of hydraulic fluid, when the pilot is allowing passage of such fluid, will bear a desired relation to the amount the pilot has been displaced from a predetermined shutoff position.

With these and further objects in view I will describe one embodiment of my invention:

In the drawing:

Fig. 1 is a partially sectioned elevation of a pilot valve assembly embodying my invention.

Fig. 2 is an elevation of a part of the pilot illustrated in Fig. 1, the view being in the direction of the arrows, between the points 2—2.

Fig. 3 is a plan view of the part shown in Fig. 2.

Figs. 4 and 5 are two views of a part of a pilot showing a second embodiment of my invention.

Referring to Fig. 1, I have indicated at 1 a pilot casing to which hydraulic fluid under pressure is admitted through the pipe 2 and from which such fluid may be drained through the pipe 3. The pipes 4 and 5 lead to the two sides of a piston to be positioned in a cylinder, comprising a hydraulic power device for accomplishing useful work. Controlling the passage of hydraulic fluid through the pipes 4 and 5 is a pilot 6 adapted to be positioned axially in the pilot casing 1 through a universal connection 7, by a relatively weak control force which may be applied at 8.

The pilot 6 is shown as having two enlargements, each having cylindrical land portions indicated respectively at 11 and 12, closely fitting the internal bore of the casing 1. The enlargements are spaced along the pilot 6 as are the ports 9 and 10 which communicate respectively with the pipes 4 and 5, and when the pilot is in a predetermined position axially of the casing 1, lie opposite and close off from fluid passage the ports 9 and 10. While I have shown the pilot as having two such enlargements, they might be more or less in number, depending upon the usage to which the pilot valve is put.

The enlargements of the pilot 6 at each end of the land portions 11 and 12 form recesses with the internal wall of the casing 1, designated at 13 as being two in number, and are formed by beveling or flatting off at one or more points a part of the cylinder extending beyond the cylindrical land sections 11 and 12. The flattened or beveled portions of the cylinder extend longitudinally from the land sections 11 or 12 toward the end of the cylinder, these portions being spaced circumferentially of the cylinder and separated by portions of the cylinder having the same diameter as that of the cylindrical land sections 11 or 12.

Each recess 13, as indicated in Fig. 1, is of a shape defined as that part of a cylinder removed by a plane passing through both end faces but not crossing the axis of the cylinder, and not lying parallel to the axis; the said planes not intersecting within the confines of the cylinder. In Figs. 4 and 5 the part removed is of the same nature except that the cutting plane is shown as lying parallel to but not coincident with the axis of the cylinder, nor intersecting with another cutting plane within the confines of the cylinder. The recess may be further defined, in that a succession of planes cutting the recess transversely at right angles to the axis of the pilot 6 define segments of a circle, which in the case of Fig. 1, are of increasing height the further away from the cylindrical land section 11, while in Figs. 4 and 5 the segments are of equal height throughout the length of the recess.

Broadly, I consider a pilot of any shape having a part or parts of its surface closely fitting the bore of the casing throughout its effective length, as recessed and coming within the scope of my invention; its effective length comprising any part which comes opposite the related port opening throughout the possible axial movement of the pilot. Such a definition of recessed precluding any annular reduction in area in a plane normal to the axis and adjacent a land portion. Thus the ends of the pilot on either side of the land may take the form of a sector or segment of a cylinder, or they may take the form of the remnants of a cylinder remaining after one or more sectors or segments have been removed therefrom, but not necessarily so.

It will be seen that the plane forming the surface of the recess nearest the axis of the pilot 6 may be parallel to said axis, or may be at any desired inclination to same, as indicated first in Figs. 4 and 5, and secondly in Figs. 1 and 2, or at any intermediate or greater inclination to the axis. It is not necessary that the recesses 13 lie in axial alignment with each other at opposite ends of the cylindrical land portion on one enlargement, or on one enlargement relative to the other. Nor is it necessary that there be only two of said recesses at each end of the enlargement, nor that there be equal numbers of said recesses at one end of an enlargement relative to the other end.

When the pilot 6 is in a predetermined axial position, the cylindrical land portions 11 and 12 close off the port openings 9 and 10 respectively, and when the pilot is moved axially relative to said predetermined position there will be possible a passage of hydraulic fluid whenever one of the recesses 13 is in axial alignment with one of the port openings to form a passage therewith for hydraulic fluid. To periodically bring the recesses in axial alignment with the port openings, I have provided rotating means for the pilot, indicated in Fig. 1 as a gear 14 fastened to the pilot and driven by an elongated pinion 15 through the medium of a motor 16 connected to a source of power 17 and having variable speed control through a rheostat 18, whereby the frequency or speed of rotation of the pilot 6 may be varied.

In operation, when the variation of a controlling factor applied at 8 dictates a flow of hydraulic fluid, for example to the pipe 5 and from the pipe 4, the pilot 6 will be moved axially downward as shown in Fig. 1 until the cylindrical land portion 11 is downwardly out of alignment with the port opening 9, and similarly, the cylindrical land portion 12 is downwardly out of alignment with the port opening 10. Hydraulic fluid under pressure available at the pipe 2, and consequently within the pilot casing 1 between the two pilot enlargements, will enter the port opening 10 through the recess 13 above the cylindrical land portion 12 whenever one of said recesses 13, upon rotation, is brought into axial alignment with the port opening 10. Simultaneously and through the same action, hydraulic fluid is bled from the port opening 9 past the recess 13 above the cylindrical land portion 11 and to the drainpipe 3.

It will be seen that fluid passes through the ports 9 and 10 intermittently, and that the frequency with which a recess 13 comes into axial alignment with a port opening is dependent not only upon the number of the recesses 13 around the pilot stem, but also upon the speed with which the pilot is rotated, and such speed may be varied through the instrumentality of the rheostat 18.

Through the construction of the pilot 6 which I have shown, I have the advantage that when one of the recesses 13 is in alignment with one of the port openings, the rate of flow of hydraulic fluid to said port opening bears a definite relation to the area of the circle segment at the entrance to the port, depending upon the distance axially that the pilot 6 has been moved from its predetermined position.

I have a pilot valve which through the intermittent or periodic transmittal of hydraulic fluid tends to prevent hunting and overtravel of the hydraulic power device, and through the variation in rate of flow of fluid with departure from the predetermined position, gives a control characteristic approaching an asymptote.

I have described the operation of one embodiment of my invention, but it will be seen that I may vary the shape of the recesses 13 to give various desired functional or other relations between movement of the pilot 6 in either direction from a predetermined position and the rate of flow of hydraulic fluid through the port openings to hydraulic power devices. Likewise I may vary the number of recesses at each end of the pilot enlargement, and I may vary the frequency with which the recesses come into axial alignment with the port openings. Furthermore, the pilot may be of a type requiring one or more enlargements on the pilot stem depending upon the number of port openings.

It is expressly understood that by illustrating and describing one embodiment of my invention I have not limited the invention other than as stated in the claims in view of prior art.

What I claim as new and desire to secure by Letters Patent of the United States, is:

1. A pilot valve construction comprising in combination a casing having a cylindrical chamber with an opening extending through the casing to the chamber for the passage of hydraulic fluid; a pilot within said chamber adapted to control the flow of fluid through the opening and including a substantially cylindrical member having a cylindrical land portion, and flattened side portions extending longitudinally from said land portion to the end of the cylindrical member, said flattened portions being spaced circumferentially of the cylindrical member, the surfaces of the cylindrical member between said flattened portions being of the same diameter as that of the cylindrical land portion and extending longitudinally thereof to the end of the cylindrical member; means for moving said pilot axially of the casing to move the land portion relative to the opening to control the flow of fluid therethrough; and means for rotating said pilot to periodically present the flattened and cylindrical end portions of the cylindrical member to the opening when the cylindrical land portion has moved away from said opening.

2. A pilot valve construction comprising in combination a casing having a cylindrical chamber with an opening extending through the casing to the chamber for the passage of hydraulic fluid; a pilot within said chamber adapted to control the flow of fluid through the opening and including a substantially cylindrical member having a cylindrical land portion intermediate its ends, and flattened side portions extending longitudinally from said land portion to the opposite ends of the cylindrical member, said flattened portions being spaced circumferentially of the cylindrical member both above and below the cylindrical land portion, the surfaces of the cylindrical member between said flattened portions being of the same diameter as the cylindrical land portion and extending longitudinally therefrom to the opposite ends of the cylindrical member; means for moving said pivot axially of the casing to move the land portion relative to the opening to control the flow of fluid therethrough, and means for rotating said pilot to periodically present the flattened and cylindrical end portions of the cylindrical member to the opening when the cylindrical land portion has moved away from said opening.

3. A pilot valve construction comprising in combination a casing having a cylindrical chamber with an opening extending through the casing to the chamber for the passage of hydraulic fluid; a pilot within said chamber adapted to control the flow of fluid through the opening and including a substantially cylindrical member having a cylindrical land portion, and flattened side portions extending longitudinally from said land portion to the end of the cylindrical member, said flattened portions being spaced circumferentially of the cylindrical member and having their longitudinal surfaces inclined inwardly from the cylindrical land portion to the end of the cylindrical member, the surfaces of the cylindrical member between said inclined flattened portions being of the same diameter as the cylindrical land portion and extending longitudinally therefrom to the end of the cylindrical member; means for moving said pilot axially of the casing to move the land portion relative to the opening to control the flow of fluid therethrough; and means for rotating said pilot to periodically present the inclined flattened and cylindrical end portions of the cylindrical member to the opening when the cylindrical land portion has moved away from said opening.

4. A pilot valve construction comprising in combination a casing having a cylindrical chamber with an opening extending through the casing to the chamber for the passage of hydraulic fluid; a pilot within said chamber adapted to control the flow of fluid through the opening and including a substantially cylindrical member having a cylindrical land portion intermediate its ends and flattened side portions extending longitudinally from said land portion to the opposite ends of the cylindrical member, said flattened portions being spaced circumferentially of the cylindrical member both above and below the cylindrical land portion and having their longitudinal surfaces inclined inwardly from the cylindrical land portion to the opposite ends of the cylindrical member, the surfaces of the cylindrical member between said inclined flattened portions being of the same diameter as the cylindrical land portion and extending longitudinally therefrom to the opposite ends of the cylindrical member; means for moving said pilot axially of the casing to move the land portion relative to the opening to control the flow of fluid therethrough; and means for rotating said pilot to periodically present the inclined flattened and cylindrical end portions of the cylindrical member to the opening when the cylindrical land portion has moved away from said opening.

5. A pilot valve construction comprising in combination a casing having a cylindrical chamber with an opening extending through the casing to the chamber for the passage of hydraulic fluid; a pilot within said chamber adapted to control the flow of fluid through the opening and including a substantially cylindrical member having a cylindrical land portion, and flattened side portions extending longitudinally from said land portion to the end of the cylindrical member, said flattened portions being spaced circumferentially of the cylindrical member and having their flat longitudinal surfaces parallel to the axis of the cylindrical member, the surfaces of the cylindrical member between said flattened portions being of the same diameter as the cylindrical land portion and extending longitudinally therefrom to the end of the cylindrical member; means for moving said pilot axially of the casing to move the land portion relative to the opening to control the flow of fluid therethrough; and means for rotating said pilot to periodically present the flattened and cylindrical end portions of the cylindrical member to the opening when the cylindrical land portion has moved away from said opening.

6. A pilot valve construction comprising in combination a casing having a cylindrical chamber with an opening extending through the casing to the chamber for the passage of hydraulic fluid; a pilot within said chamber adapted to control the flow of fluid through the opening and including a substantially cylindrical member having a cylindrical land portion intermediate its ends, and flattened side portions extending longitudinally from said land portion to the opposite ends of the cylindrical member, said flattened portions being spaced circumferentially of the cylindrical member and having their longitudinal surfaces parallel to the axis of the cylindrical member, the surfaces of the cylindrical member between said flattened portions being of the same diameter as the cylindrical land portion and extending longitudinally therefrom to the opposite ends of the cylindrical member; means for moving said pilot axially of the casing to move the land portion relative to the opening to control the flow of fluid therethrough; and means for rotating said pilot to periodically present the flattened and cylindrical end portions of the cylindrical member to the opening when the cylindrical land portion has moved away from said opening.

JAMES M. WILSON.